UNITED STATES PATENT OFFICE.

JOHN E. WYNKOOP, OF POTTSVILLE, PENNSYLVANIA.

PROCESS OF MAKING AND COMPOSITION FOR PAVEMENTS AND OTHER PURPOSES.

SPECIFICATION forming part of Letters Patent No. 302,679, dated July 29, 1884.

Application filed February 20, 1884. (No specimens.)

*To all whom it may concern:*

Be it known that I, JOHN E. WYNKOOP, a citizen of the United States of America, residing at Pottsville, in the county of Schuylkill and State of Pennsylvania, have invented a new and useful Improvement in Processes of Making and Compositions for Pavements and other Purposes, which I term "Cinderlithic Pavement or Composition," of which the following is a specification.

This invention relates to compositions for artificial stone, especially adapted for sidewalks and for other purposes, such as building-blocks and drain and water pipes, and the art of making the same.

In making this composition I take slag or cinder such as comes from blast-furnaces, and granulate it into grains of determinate sizes, from a two-inch cube to such as will pass through a number-ten sieve. The granules of different sizes are carefully proportioned, so as to fill the voids when placed in the mold. This granulated furnace-slag is then mixed with Portland cement, in the proportions of four parts of granulated slag to one part of cement, or thereabout, as the character of the work may require. This mixture of cement and furnace-slag in grains of regulated sizes is then dampened with lime-water containing a solution of adhesive material, and placed, while in this dampened and comparatively-dry non-plastic state, in the molds, care being taken that the granules are evenly distributed; and then the mass is subjected to a severe tamping until it is reduced to about one-third of its original bulk when placed in the mold, and then it is allowed to harden.

The liquid mixture for dampening the granulated slag may be composed of glue, three parts; starch, three parts; lime, three parts, and water, one hundred parts.

In laying artificial-stone pavements with this composition I proceed as follows: To form a section of the pavement I lay down pieces of timber called "racks" or "screeds," of suitable length and thickness. The racks are rigidly fastened to the ground by pins, and constitute a mold for the composition. This mold is then filled flush with the surface-line of the pavement with the composition above described in a comparatively dry state. The composition is then subjected to a severe tamping with iron tamping-bars, which reduce it to one-third of its original thickness. This compact layer is then lined off in any suitable design, and subsequently cut through on the lines indicated, forming squares or blocks. The surface is then well scratched or scored to receive the finishing layer. For the finishing layer I take granulated furnace-slag or very sharp sand and mix it with Portland cement, in the proportions of about six parts of slag or sand to four parts of cement. These materials are then mixed in a plastic state with the liquid mixture above described. The mold is then filled with the plastic mass, which forms the top layer. This layer is cut on lines to correspond with the cutting of the foundation layer and allowed to harden. The racks are removed and used as a mold for another section, which is filled as before.

I am aware that furnace-slag has heretofore been used in compositions for pavements and other purposes; but it has heretofore been used in a finely pulverized or powdered form, and mixed to a plastic state with other ingredients, while in my invention it is used in granulated form and a non-plastic state.

I claim as my invention and desire to secure by Letters Patent—

1. A composition for pavements and other purposes, composed of furnace-slag in grains of regulated sizes, as described, and Portland cement, in about the proportions set forth, dampened with lime-water containing adhesive matter, and the mass thoroughly tamped and allowed to harden, substantially as set forth.

2. The process of making compositions, which consists in mixing furnace-slag in grains of regulated sizes, as described, and cement, in about the proportions set forth, dampening said mixture with lime-water containing adhesive matter, then tamping said mixture in molds while in the dampened, comparatively dry, and non-plastic state, and allowing the same to harden, substantially as set forth.

3. The process of laying a pavement, which consists in spreading a foundation layer composed of furnace-slag in grains of regulated sizes in a non-plastic state, and dampened with lime-water containing adhesive matter, then compacting or tamping the same, then cutting said foundation layer into divisions or
5 blocks, and then spreading the finishing layer composed of furnace-slag or sharp sand and cement mixed to a plastic state, with such lime-water, substantially as described.

In testimony whereof I affix my signature in the presence of two witnesses.

JOHN E. WYNKOOP.

Witnesses:
   JAS. C. WILLIAMS,
   LEWIS GRANT.